United States Patent [19]

Tsujiuchi

[11] 3,945,692

[45] Mar. 23, 1976

[54] HIGH RIGIDITY FLUID BEARING AND METHOD FOR MANUFACTURING THE SAME

[75] Inventor: Toshio Tsujiuchi, Anjo, Japan

[73] Assignee: Toyoda-Koki Kabushiki Kaisha, Japan

[22] Filed: Oct. 16, 1974

[21] Appl. No.: 515,329

[30] Foreign Application Priority Data

Oct. 30, 1973 Japan............................ 48-122106

[52] U.S. Cl. ................ 308/9; 308/122; 308/DIG. 1
[51] Int. Cl.² ........................................ F16C 29/00
[58] Field of Search .......... 308/9, 122, DIG. 1, 107, 308/187

[56] References Cited

UNITED STATES PATENTS

| | | | |
|---|---|---|---|
| 3,101,224 | 8/1963 | Adams | 308/122 |
| 3,508,799 | 4/1970 | Gordon | 308/122 |

Primary Examiner—M. H. Wood, Jr.
Assistant Examiner—Gene A. Church
Attorney, Agent, or Firm—Oblon, Fisher, Spivak, McClelland & Maier

[57] ABSTRACT

A high rigidity fluid bearing adapted to rotatably support a rotary shaft on a stationary base and a method for manufacturing the same. The fluid bearing is provided with a bearing bushing which includes a plurality of fluid pockets spaced apart in the circumferential direction, a land portion surrounding the fluid pockets, throttles connected respectively to the fluid pockets, and a raised land formed in each of the fluid pockets. On the bearing bushing, a deformable portion is formed around the raised land. The bearing bushing is urged and fixed to an arbor inserted therein and having a diameter smaller than that of the bore thereof at one end of each raised land so as to form a wedge-shape clearance between the raised land and the arbor. The outer periphery of the bearing bushing fixed to the arbor is machined to a true or proper circle. After removed from the arbor, the bearing bushing is fitted to the stationary base. Each raised land is then arranged so as to protrude toward the outer periphery of the rotary shaft, inserted to the bearing bushing beyond the surface of the land portion to thereby form the wedge-shape clearance to bring a high rigidity to the fluid bearing.

2 Claims, 6 Drawing Figures

HIGH RIGIDITY FLUID BEARING AND METHOD FOR MANUFACTURING THE SAME

BACKGROUND OF THE INVENTION

1. Field of the Invention:

The present invention relates to a high rigidity bearing used for the rotary shaft of a machine tool and a method for manufacturing the same.

2. Description of the Prior Art:

In a machining operation, an excessive load is apt to be applied to rotary shafts, particularly to a main spindle. Therefore, a high rigidity fluid bearing such as a hydrodynamic pressure effect bearing has been employed to maintain the rotary shaft accurately in its original axial position. In such a hydrostatic bearing the bearing clearance on a land portion which is formed on the bearing surface of a bearing bushing could not be formed with a small enough clearance which would be adequate for generation of sufficient hydrodynamic pressure because a hydrostatic pressure is generated in a large bearing clearance in comparison with the hydrodynamic pressure.

In a conventional method for manufacturing such a fluid bearing, a large radial force is applied by means of clamping bolts, circumferentially located around the bearing bushing, to the outer periphery of the bearing bushing. In this state, the bearing surface is formed to a true or proper circle on the bore of the bearing bushing. Accordingly, when the radial force is removed from the bearing bushing, a plurality of raised lands which have been held in an inwardly urged state by the clamping bolts during the machining operation are outwardly retracted from the hydrostatic pressure-generating land portion so as to form wedge-shape clearances between the rotary shaft and the raised lands. Thus, the hydrodynamic pressure is generated in the wedge-shape clearances when the rotary shaft is rotating.

This prior art manufacturing method did not, however, provide accurate wedge-shaped clearances to the hydrostatic bearing because it was difficult to accurately set the amount of thrust for the clamping bolts and it was also difficult to positively support the bearing bushing by the clamping bolts in a stable state during the machining operation of the bore of the bearing bushing. Furthermore, since the raised lands were arranged so as to be retracted away from the outer periphery of the rotary shaft beyond the surface of the hydrostatic pressure-generating land portion, the wedge-shape clearances were made wider than that of the hydrostatic pressure-generating land portion. As a result, the hydrostatic bearing which was manufactured by the above-mentioned method could not obtain a sufficient hydrodynamic pressure effect.

SUMMARY OF THE INVENTION

It is, therefore, an object of the present invention to provide an improved high rigidity fluid bearing having a high hydrodynamic pressure effect.

It is another object of the present invention to provide an improved high rigidity fluid bearing which is provided with a bearing bushing, the bearing surface of which is formed so as to generate a high hydrodynamic pressure to thereby support a rotary shaft with high rigidity.

Another object of the present invention is to provide an improved high rigidity fluid bearing which is provided with a bearing bushing; on the bearing surface of which hydrodynamic pressure-generating lands are formed so as not to affect a hydrostatic pressure-generating operation to thereby support a rotary shaft with high rigidity.

Still another object of the present invention is to provide an improved high rigidity fluid bearing which is provided with a bearing bushing within a plurality of hydrodynamic pressure-generating lands are formed so as to protrude toward a rotary shaft beyond a hydrostatic pressure-generating land to form wedge-shape clearances therebetween to thereby raise the rigidity of the fluid bearing.

A further object of the present invention is to provide a new and unique method for manufacturing a high rigidity fluid bearing having a high hydrodynamic pressure effect.

A further object of the present invention is to provide a new and unique method for manufacturing a high rigidity fluid bearing which is provided with a bearing bushing, the bearing surface of which is formed so as to generate a high hydrodynamic pressure to thereby support a rotary shaft with high rigidity.

A still further object of the present invention is to provide a new and unique method for manufacturing a high rigidity fluid bearing which is provided with a bearing bushing wherein a plurality of hydrodynamic pressure-generating lands are formed so as to protrude toward a rotary shaft beyond a static pressure-generating land to form wedge-shape clearances therebetween and so as not to affect a hydrostatic pressure-generating operation.

According to the present invention, these and other objects are achieved by a high rigidity fluid bearing which comprises a bearing bushing including a plurality of fluid pockets spaced apart in the circumferential direction, a land portion surrounding the plurality of fluid pockets, for a hydrostatic pressure, throttles connected to the fluid pockets for admitting a pressurized fluid to the same, and a raised land formed in each of the fluid pockets. The method for manufacturing such a high rigidity fluid bearing includes the steps of forming a deformable portion around each raised land, fixing the bearing bushing to an arbor, inserted therein at one end of the raised land, the arbor having a diameter smaller than hat of the bore of the bearing bushing, machining the outer periphery of the bearing bushing, fixed to the arbor to a true or proper circle, removing the arbor from the machined bearing bushing, and fitting the bearing bushing to the bore of a stationary base. Thus, each raised land of the fitted bearing bushing is again deformed so as to protrude at one radial end thereof toward the outer periphery of the rotary shaft beyond the surface of the land portion to thereby form a wedge-shape clearance wherein a high hydrodynamic pressure is generated to thereby support the rotary shaft with high rigidity. As mentioned above, since only the raised lands can be deformed when the bearing bushing is fitted to the bore of the stationary base, a plurality of wedge-shape clearances formed between the raised lands and the outer periphery of the rotary shaft can be formed to an optimum size and shape by selecting the diameter of the arbor and by adjusting the fixing force when the bearing bushing is fixed to the arbor.

BRIEF DESCRIPTION OF THE DRAWINGS

The foregoing and other objects of the present invention will be more fully appreciated as the same becomes better understood from the following description of a preferred embodiment when considered in connection with the accompanying drawings, in which.

DETAILED DESCRIPTION OF A PREFERRED EMBODIMENT

Figure 1:
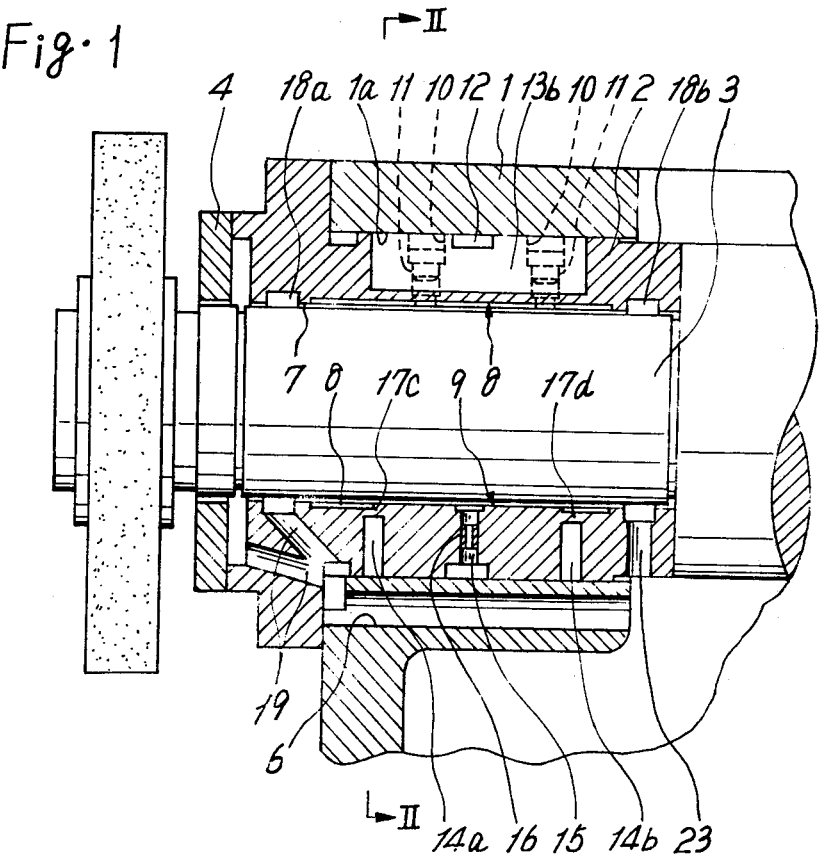
FIG. 1 is a longitudinal sectional view showing a fluid bearing according to the present invention.

A stationary base 1 has a bore 1a to which a bearing bushing 2 is fitted for rotatably supporting a rotary shaft 3. A cap member 4 is fixed to the axial end of the bearing bushing 2. An inlet pssage 5 is radially formed on the stationary base 1 for admitting a pressurized fluid to the bearing bushing 2. Numeral 6 designates an outlet passage which is axially formed on the stationary base 1 for returning used fluid to a reservoir (not shown).

Figure 2:
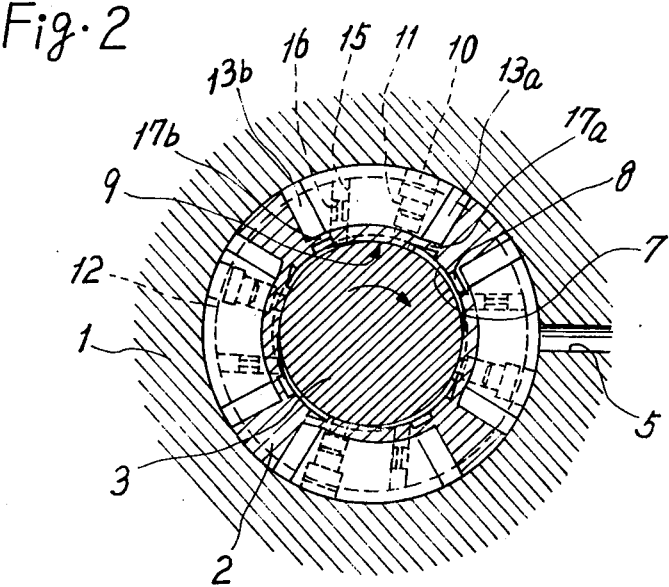
FIG. 2 is a cross sectional view taken along the line II-II of FIG. 1.
Figure 3:
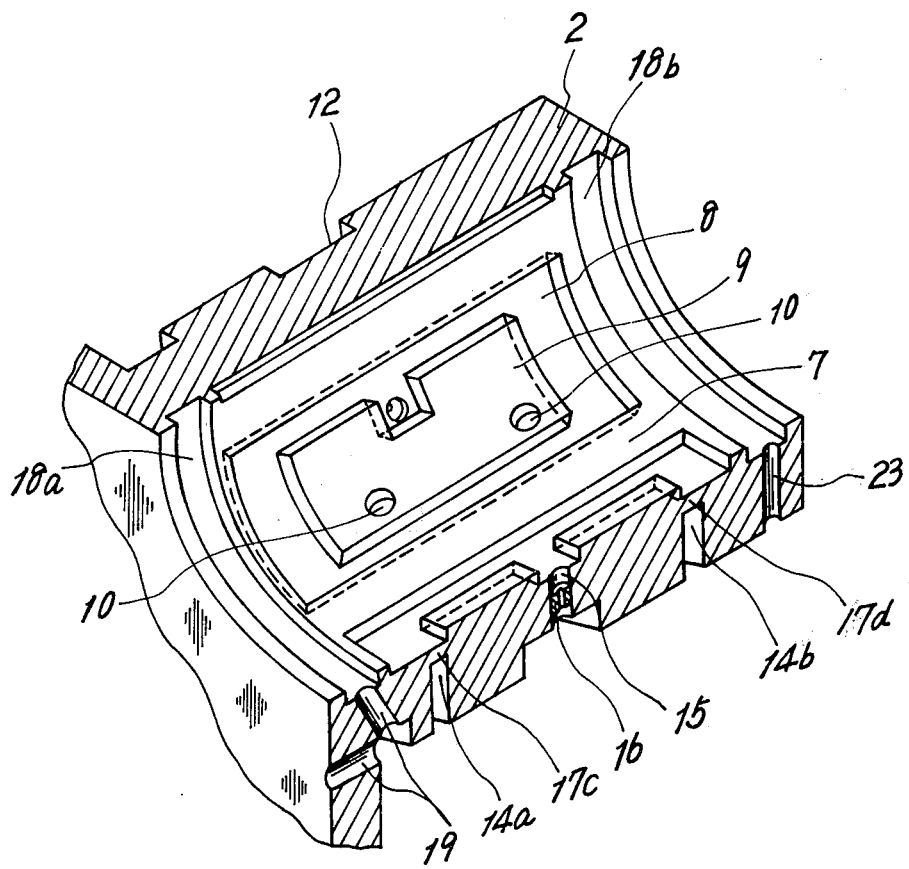
FIG. 3 is a perspective view, fragmentarily showing the main portion of a bearing bushing.

The detailed shape of the bearing bushing 2 is described hereunder with reference to FIGS. 1 to 3.

A plurality of fluid pockets 8 are formed at regular intervals in the circumferential direction on the inner surface of the bearing bushing 2. Each of the fluid pockets 8 is surrounded by a land portion 7 where a hydrostatic pressure is generated. A raised land 9, where hydrodynamic pressure is generated, is formed in each of the pockets 8 in such a manner that one radial end thereof protrudes beyond the land portion 7 from the bottom of the fluid pocket 8, and the other radial end thereof is the same height as the land portion 7 as is fully described hereinafter. A pair of axially spaced screw bores 10 are formed at one radial end of each raised land 9. These screw bores 10 are provided for a machining operation of the bearing bushing 2, as described hereunder. Before the bearing bushing 2 is fitted to the stationary base 1, the screw bores 10 are sealed by suitable stoppers 11 so that the pressurized fluid which is supplied to the clearance between the rotary shaft 3 and the bearing bushing 2 will not leak through the screw bores 10.

An annular groove 12 is formed on the outer periphery of the bearing bushing 2 so as to face the inlet passage 5 when the bearing bushing 2 is fitted to the stationary base 1. The annular groove 12 is connected to fluid pockets 8 through supply passages 15 to which throttles 16 are fixed. Thus, the pressurized fluid which is admitted to the annular groove 12 through the inlet passage 5 is individually supplied to fluid pockets 8 through supply passages 15 and throttles 16. A rectangular slot, including axial slots 13a and 13b and radial slots 14a and 14b, is formed on the outer periphery of the bearing bushing 2 corresponding to the back of each fluid pocket 8 so as to form a rectangular deformable portion, including axial portions 17a and 17b and radial portions 17c and 17d, around the raised land 9. The rectangular deformable portion is thin and deformable such that one radial end of the raised land 9 may be inwardly protruded beyond the land portion 7 but the other radial end of the raised land 9 may be of the same height as the land portion 7 when a radial force is applied in an inward direction to the outer periphery of the bearing bushing 2 which outer periphery is surrounded by the rectangular slot. Annular exhaust grooves 18a and 18b are formed at both ends of the inner surface of the bearing bushing 2 for exhausting fluid, which overflows the land portion 7, to the reservoir. Outlet ports 19 are formed on the bearing bushing 2 for connecting one annular exhaust groove 18a to the outlet passage 6. An outlet port 23 is radially formed on the bearing bushing 2 for connecting the other annular exhaust groove 18b to the reservoir.

Figure 4:
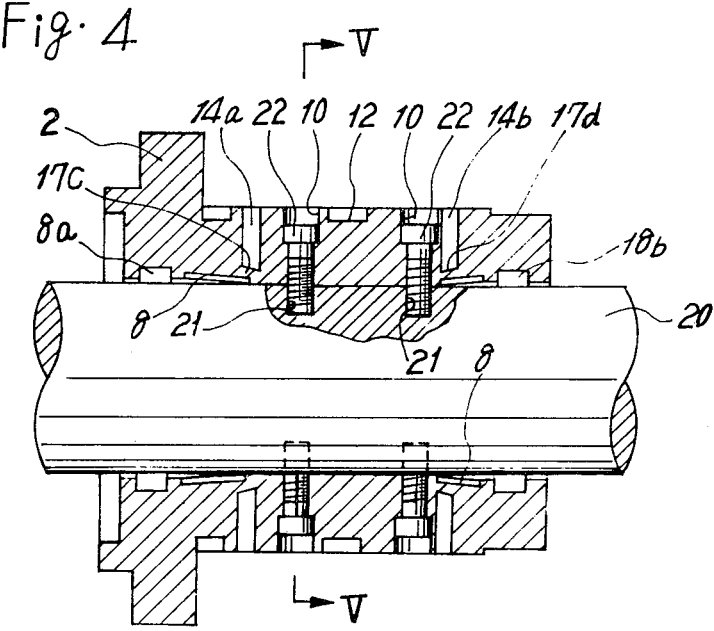
FIG. 4 is a longitudinal cross sectional view showing the bearing bushing, raised lands of which are urged and fixed at one end thereof to an arbor by means of bolts.
Figure 5:
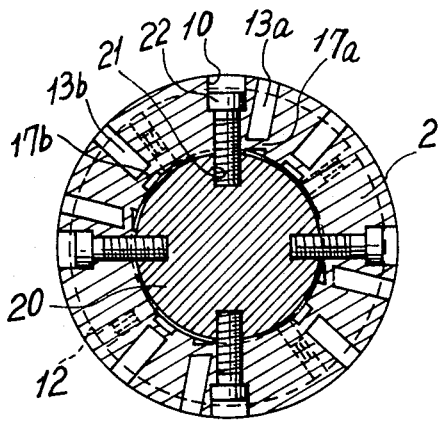
FIG. 5 is a cross sectional view taken along the line V-V of FIG. 4.
Figure 6:
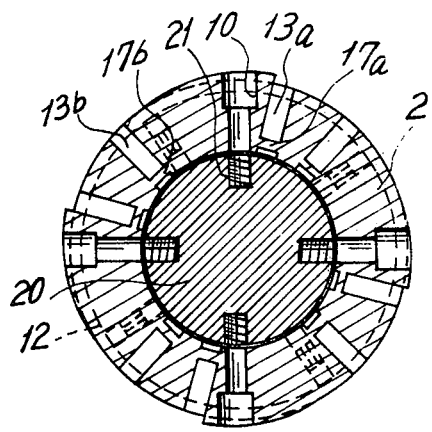
FIG. 6 is a cross sectional view showing the state after the bolts are removed from the condition shown in FIGS. 4 and 5.

Hereunder is described a method for machining the bearing bushing 2, mentioned above, having raised lands 9, one radial portion of each of which is protruded toward the peripheral surface of the rotary shaft 3 when the bearing bushing 2 is fitted to the bore 1a of the stationary base 1, with reference to FIGS. 4 to 6.

The bearing bushing 2 is first machined so as to have fluid pockets 8, land portions 7, raised lands 9, rectangular deformable portions and annular grooves 18a and 18b on the inner surface of the bore thereof. The bore of the bearing bushing 2 is then machined and finished to a true or proper circle so as to have a predetermined diameter relative to the rotary shaft 3. An arbor 20 having a predetermined diameter a little smaller than that of the bore of the bearing bushing 2 is inserted to the bore of the bearing bushing 2. Threaded bores 21, which are formed on the arbor 20, are aligned with screw bores 10 of the bearing bushing 2. Bolts 22 are inserted into screw bores 10 and threadedly engaged with threaded bores 21. The bolts 22 are turned and clamped until one radial end of each raised 1 and 9 comes to tight engagement with the arbor 20 so as to form a wedge-shape clearance, as shown in FIGS. 4 and 5. The resultant deformed outer periphery of the bearing bushing 2 is then machined to a true or proper circle in accordance with the bore 1a of the stationary base 1. After the machining operation, the bolts 22 are removed from the arbor 20 and the bearing bushing 2. The bore of the bearing bushing 2 then returns in shape to its initial true or proper circle by the restoration of rectangular deformable portions, as shown in FIG. 6. To the contrary, the outer peripheral portions, surrounded by the rectangular slots, protrude outwardly to thereby form a non-circular cross section.

When the bearing bushing 2 is fitted to the bore 1a of the stationary base 1, the outer periphery of the bearing bushing 2 is re-deformed in accordance with the true or proper circle of the bore 1a and is urged toward the axial line of the bore so that one radial end of each raised land 9 may be pushed toward and approaches the outer periphery of the rotary shaft 3 under the deformation of the rectangular deformable portion including axial portions 17a and 17b and radial portions 17c and 17d, to thereby form the wedge-shape clearance between each raised land 9 and the rotary shaft 3.

The fluid bearing according to the present invention is constituted as mentioned above. When the pressurized fluid is applied to the inlet passage 5 of the fluid bearing, the pressurized fluid is supplied to the fluid pockets 8 through the annular groove 12, supplying passages 15 and throttles 16. The hydrostatic pressure is thus generated in the fluid pockets 8 to thereby rotatably support the rotary shaft 3. Furthermore, the wedge-shape clearances are formed between the outer periphery of the rotary shaft 3 and the one end of the raised lands which are protruded to the outer periphery of the rotary shaft 3. Therefore, in addition to the hydrostatic pressure the rotary shaft 3 is supported by the hydrodynamic pressure which is caused by the clockwise rotation of the rotary shaft 3, as shown by an arrow in FIG. 2.

Although a certain specific embodiment of the invention has been shown and described, it is obvious that many modifications and variations of the present invention are possible in light of the above teachings. It is understood, therefore, that within the scope of the appended claims, the invention may be practiced otherwise than as specifically described herein.

What is claimed as new and desired to be secured by letters patent of the United States is:

1. A fluid bearing adapted to rotatably support a rotary shaft on a stationary base and provided with a bearing bushing including a plurality of fluid pockets spaced apart in the circumferential direction, a land portion surrounding said plurality of fluid pockets, and throttle means connected to said fluid pockets for admitting a pressurized fluid to the same, the improvement of said bearing bushing comprising:

a raised land formed in each of said fluid pockets, a portion of said raised land protruding toward the outer periphery of said rotary shaft beyond the surface of said land portion so as to form a wedged-shape clearance therebetween, and a deformable portion formed around said raised land.

2. A fluid bearing according to claim 1, wherein said deformable portion comprises a rectangular slot formed on said bearing bushing around said raised land.

* * * * *